United States Patent
Hoffmann

(10) Patent No.: US 10,544,060 B2
(45) Date of Patent: Jan. 28, 2020

(54) COMPOSITION FOR METAKAOLIN CONSTRUCTION MATERIAL, RELATED METHOD FOR MANUFACTURING SAID COMPOSITION, AND USE FOR PRODUCING CONSTRUCTION ELEMENTS

(71) Applicant: HOFFMANN JB TECHNOLOGIES, Chaille-sous-les-Ormeaux (FR)

(72) Inventor: David Hoffmann, Saint Ouen des Toits (FR)

(73) Assignee: HOFFMANN GREEN CEMENT TECHNOLOGIES, Rives de l'Yon (FR)

( * ) Notice: Subject to any disclaimer, the term of this patent is extended or adjusted under 35 U.S.C. 154(b) by 53 days.

(21) Appl. No.: 15/561,875

(22) PCT Filed: Mar. 25, 2016

(86) PCT No.: PCT/FR2016/050689
§ 371 (c)(1),
(2) Date: Sep. 26, 2017

(87) PCT Pub. No.: WO2016/156722
PCT Pub. Date: Oct. 6, 2016

(65) Prior Publication Data
US 2018/0111878 A1    Apr. 26, 2018

(30) Foreign Application Priority Data

Mar. 27, 2015 (FR) ...................... 15 52615

(51) Int. Cl.
| | | |
|---|---|---|
| C04B 28/26 | (2006.01) | |
| C04B 14/10 | (2006.01) | |
| C04B 38/02 | (2006.01) | |
| B33Y 70/00 | (2015.01) | |
| C04B 111/00 | (2006.01) | |
| C04B 111/40 | (2006.01) | |
| C04B 111/60 | (2006.01) | |

(52) U.S. Cl.
CPC .............. *C04B 28/26* (2013.01); *B33Y 70/00* (2014.12); *C04B 14/106* (2013.01); *C04B 38/02* (2013.01); *C04B 2111/00181* (2013.01); *C04B 2111/00482* (2013.01); *C04B 2111/00594* (2013.01); *C04B 2111/00612* (2013.01); *C04B 2111/00637* (2013.01); *C04B 2111/40* (2013.01); *C04B 2111/60* (2013.01)

(58) Field of Classification Search
CPC ....... C04B 28/26; C04B 14/106; C04B 38/02; C04B 2111/00181; C04B 2111/00594; C04B 2111/00612; C04B 2111/40; C04B 2111/60; C04B 2111/00482; C04B 2111/00637; B33Y 70/00
See application file for complete search history.

(56) References Cited

U.S. PATENT DOCUMENTS

| | | | |
|---|---|---|---|
| 4,306,912 A | 12/1981 | Forss | |
| 4,472,199 A | 9/1984 | Davidovits | |
| 4,640,715 A | 2/1987 | Heitzmann et al. | |
| 4,642,137 A | 2/1987 | Heitzmann et al. | |
| 4,859,367 A | 8/1989 | Davidovits | |
| 5,084,102 A | 1/1992 | Brouns et al. | |
| 5,349,118 A | 9/1994 | Davidovits | |
| 5,372,640 A | 12/1994 | Schwarz et al. | |
| 5,601,643 A | 2/1997 | Silverstrim et al. | |
| 7,229,491 B2 | 6/2007 | Davidovits et al. | |
| 8,202,362 B2 | 6/2012 | Davidovits et al. | |
| 2012/0192765 A1 | 8/2012 | Huynh | |

FOREIGN PATENT DOCUMENTS

| | | |
|---|---|---|
| CZ | 289735 B6 | 3/2002 |
| EP | 2061732 A2 | 5/2009 |
| EP | 2 061 732 B1 | 4/2010 |
| FR | 2489290 A2 | 3/1982 |
| FR | 2489291 A1 | 3/1982 |
| FR | 2528818 A1 | 12/1983 |
| FR | 2621260 A1 | 4/1989 |
| FR | 2659319 A1 | 9/1991 |
| FR | 2669918 A1 | 6/1992 |
| FR | 2758323 A1 | 7/1998 |
| FR | 2839970 A1 | 11/2003 |
| FR | 2 966 823 A1 | 5/2012 |
| FR | 2966823 A2 | 5/2012 |
| WO | 9204298 A1 | 3/1992 |
| WO | 9204299 A1 | 3/1992 |
| WO | 9316965 A1 | 9/1993 |
| WO | 9513995 A1 | 5/1995 |
| WO | 01/40135 A2 | 6/2001 |
| WO | 0140135 A2 | 6/2001 |
| WO | 03078349 A1 | 9/2003 |
| WO | 2005019130 A1 | 3/2005 |
| WO | 2012/056125 A1 | 5/2012 |
| WO | 2012056125 A1 | 5/2012 |

OTHER PUBLICATIONS

International Search Report, dated Jun. 10, 2016, from corresponding PCT application No. PCT/FR2016/050689.
Cheng et al., "Fire-resistant geopolymer produced by granulated blast furnace slag", Minerals Engineering, vol. 16, No. 3, Mar. 1, 2003.
T.W. Cheng et al., "Fire-resistant geopolymer produced by granulated blast furnace slag" Minerals Engineering Mar. 2003,vol. 16, Issue 3, pp. 205-210.
J. Davidovits, "Global Warming Impact on the Cement and Aggregates Industries", World Resource Review, 6, N°2, pp. 165-182.

*Primary Examiner* — Anthony J Green
(74) *Attorney, Agent, or Firm* — Young & Thompson

(57) ABSTRACT

Disclosed is a construction material composition including a matrix predominantly containing an aluminum silicate compound, such as a metakaolin, and an alkaline activation solution. The composition is contains less than 10 wt. % cement or clinker and in that the metakaolin is a metakaolin obtained via flash calcination. The reaction between the components is carried out at a temperature less than 30° C. The method for manufacturing the construction material includes mixing the composition with various elements such as granulates, plant fibers, unfired clay, and expanding agents. It is particularly of use in producing floor, wall, or roof coating elements, prefabricated construction elements, or insulation, adhesive, or inorganic sealant modules.

19 Claims, No Drawings

COMPOSITION FOR METAKAOLIN CONSTRUCTION MATERIAL, RELATED METHOD FOR MANUFACTURING SAID COMPOSITION, AND USE FOR PRODUCING CONSTRUCTION ELEMENTS

This invention relates to the field of construction materials, and more particularly relates to new compositions for construction materials, the associated methods thereof and the uses thereof for the carrying out in particular of construction elements or modules.

BACKGROUND OF THE INVENTION

Cement, such as Portland cement, is a very widely-used material in the field of construction. However this cement, although it is of high performance, requires, for the manufacture thereof, on the one hand, the consumption of many resources and, on the other hand, produces a non-negligible quantity of pollutants that are responsible, among others, for climate warming and acid rain. Finally, its service life, although long, is limited by the multiple degradations, in particular linked to atmospheric pollution, that it can be subjected to over time. All of these particularities make Portland cement increasingly less present in a sustainable development approach.

There are alternatives to conventional construction materials but they only partially meet the necessary performance requirements. In addition, their high economic cost is often a limit for large use.

For example geopolymers were invented around the end of the 1970's by Professor Davidovits. Their properties in terms of durability, mechanical performance and sustainable development have recently brought these new generation binders to stage front.

A geopolymer is formed from a mineral matrix comprised of silica and of alumina having reaction sites whereon cross-linking agents are made to react contained in a solution referred to as activating, generally alkaline. This reaction produces a gel with a poly(silico-oxo-aluminate) base which coats the granulates and hardens as the reaction progresses, until monolithic block is obtained comprised of a "glass" wherein the granulates are covered. However the methods for producing these geopolymers are either hardly adaptable industrially and/or use expensive products. The reactions are generally carried out with a heating of the constituents.

An example of manufacturing at ambient temperature of geopolymeric cement with a silico-aluminous fly ash (referred to as class F) is described in patent EP 2061732 B1 of J. Davidovits. However the base material, the silica-aluminous fly ash (referred to as class F), coming from coal-fired power plants, is a material that is not widely available in France.

In another more recent patent application FR 2966823 of the same inventor is described a method for manufacturing a binder or geopolymer cement comprising a first step of treatment of geologic elements rich in iron oxides and in ferro-kaolinite at a temperature from 600 to 850° C. for several hours, during which the ferro-kaolinite becomes ferro-metakaolin, then in a second step of having them react with a reaction medium of the Ca-geopolymeric type at ambient temperature or less than 85° C. The examples of this document indicate that the geopolymeric precursor which here is ferro-metakaolin is prepared during a long thermal treatment (calcination at 750° C. for 3 hours, followed by crushing) and therefore consume a substantial amount of energy.

Moreover document US 2012/0192765 A1 presents formulations of geopolymer based on a metakaolin M1200S produced according to the flash furnace AGS method. The calcination characteristics are indicated in the patent as being a temperature chamber 900 to 1000° C. bringing the kaolin to 750 to 850° C. for a very short period of time (not precisely indicated in this text).

This metakaolin M1200S has a high reactivity but its flash calcination mode produces a very fine metakaolin (paragraph [0024] indicates a D50 between 1 and 2 µm) having in particular a very high water demand (1650 g/kg in the Marsh funnel, according to the technical sheet). The required quantity of activation solution is therefore notoriously high: in particular a $(M2O+SiO_2)$/matrix ratio of 11.3 mol/kg (for the formulation "ex1") and of 10.6 mol/kg with a substantial use of superplasticiser (for the formulation "ex14"), (see the comparative tables further on).

However, the activation solution, containing soda and sodium silicate, represents a substantial proportion of the economic cost and of the environmental impact. As such the production of a tonne of soda requires more than 20 MJ of energy and 1.3 T eq $CO_2$ of a carbon footprint responsible for climate warming. In addition, soda represents, due to its substantial corrosivity, the most dangerous constituent in the formulations of geopolymers. Finally, the activation solution, through its content in saline elements is responsible for the efflorescence effects observed in geopolymers. It is therefore suitable to limit the quantities of activation solutions in the formulations to a minimum.

This invention has for purpose to overcome the disadvantages of prior art by proposing a composition for a construction material from materials that are easily available and reactive, and with a low ecological impact: in particular that do not require any long and expensive thermal treatment.

Another purpose of the invention is to propose a composition for a construction material with a reduced quantity, and even an absence of cement or clinker, that can be used for the confection of various construction modules or elements, by moulding or extrusion.

Another purpose of the invention is to propose a composition for a construction material that can be implemented in a method for manufacturing construction modules or elements in a mixture with unfired clay, without requiring firing.

DESCRIPTION OF THE INVENTION

To this effect, this invention proposes a composition for a construction material comprising a matrix predominantly containing an aluminium silicate compound, such as a metakaolin, and an alkaline activation solution, this composition is characterised in that it contains less than 10 wt. % cement or clinker, preferably less than 5%, more preferably less than 1% by weight, and in that the metakaolin is a "flashed" metakaolin (i.e. obtained via flash calcination of a powdered clay at a temperature between 600 and 900° C. for a few seconds, followed by a fast cooling), and in that the alkaline activation solution comprises a source of sodium or potassium silicate (according to the cement nomenclature containing SiO2 and M2O), and an alkaline base, such as NaOH and/or KOH, (noted as $M_2O$ according to the cement nomenclature, with M able to represent the sodium or the potassium), with the relative proportions of the activation solution and of the matrix being such that the total sum in $SiO2+M2O$ moles of the activation solution is between 3.5 and 5.5 mol/kg of matrix.

Flash metakaolin (also called flashed metakaolin) is obtained via flash calcination of a powdered clay at a temperature between 600 and 900° C. for a few seconds, followed by a fast cooling, contrary to "conventional" metakaolin which is obtained by calcination in a rotary furnace for at least 5 hours. The manufacture thereof requires much less energy, is a method with a low $CO_2$ emission and is less complex than that of conventional metakaolin since the heating period lasts only a few seconds and no crushing afterwards is required. In addition, preparation of the clay before the thermal treatment is minimal. Its environmental impact is therefore lower and its cost is not as high.

This flash metakaolin is highly reactive. The inventors have observed that the water demand (less than 600 g/kg measured in a Marsh funnel) and in activating reagents is much less substantial when flashed metakaolin is used, by about at least 50% in activating reagent compared to conventional metakaolins.
(see hereinafter comparative table no. 2)

Flash metakaolin has until now been used as an additive in cement compositions in minority weight proportions (less than 20%) with Portland cement for example.

The inventors surprisingly discovered that such a flash metakaolin can react at ambient temperature (less than 30° C.) with the alkaline activation solution by giving materials with interesting properties, such as that described further on.

The alkaline activation solution advantageously comprises a source of sodium or potassium silicate (according to the cement nomenclature contains $SiO2$ and $M2O$), and an alkaline base, such as NaOH and/or KOH, (according to the cement nomenclature of formula $M2O$, with M able to represent the sodium or the potassium).

Preferably, the source of silicate (i.e. the sodium or potassium silicate) of the activation solution has a $SiO2/M2O$ molar ratio greater than 1.5, preferably greater than 3.

Preferably, the alkaline activation solution has a global $SiO2/M2O$ molar ratio between 0.8 and 2.5, preferably between 1.0 and 2.0, more preferably between 1.20 and 1.80, more preferably between 1.25 and 1.65.

The activation solutions used in geopolymerisation are generally defined by their silica/alkaline ratio.

When this invention is carried out with activation solutions with silica/alkaline molar ratios (noted as $SiO2/M2O$) between 1.25 and 1.65 a lower propensity for the phenomenon of efflorescence is observed than with the formulations with the molar ratio less than 1.2, even less than 1, of the geopolymers of prior art, which is a substantial technical advantage. In addition, solutions with a high ratio are more stable and simpler to use.

According to an advantageous alternative of the invention, the alkaline base of the alkaline activation solution is an aqueous solution of soda NaOH. The examples mentioned further on in the description show that it is not necessary to use a very concentrated solution of soda.

In the composition according to the invention, the matrix can include, mixed with the flashed metakaolin, an unflashed metakaolin, one or several powdery mineral materials (i.e. with a granulometry advantageously less than 200 μm) which can be chosen from blast furnace slag, fly ash of class F, scraps from manufacturing chamotte and/or metakaolin, wollastonite, terra-cotta powder, coming, in particular from scraps from brickmaking, mineral powders that have a puzzolanic activity, recycled glass powder, cullet, fly ash of class C or slaked lime.

With regards to the mass concentrations of powdery materials mixed with at least 20% metakaolin in said matrix, these concentrations are advantageously as follows:

less than or equal to 80%, preferably less than 60% and more preferably less than 50% for blast furnace slag, fly ash of class F, scraps from manufacturing chamotte and/or metakaolin, wollastonite and terra-cotta powder, less than or equal to 40%, preferably less than 25% for mineral powders that have a puzzolanic activity, recycled glass powder, cullet or fly ash of class C, and less than or equal to 15%, preferably less than 10%, more preferably less than or equal to 5% for slaked lime.

According to an advantageous embodiment of the composition of the invention, the matrix comprises flashed metakaolin and blast furnace slag in a mass concentration of slag less than or equal to 30% of the total weight of the matrix.

Preferably, the relative proportions of the activation solution and of the matrix are such that the total sum in $SiO2+M2O$ moles of the activation solution is between 4.5 and 5.5 mol/kg of matrix, preferably between 4.5 and 5.3 mol/kg of matrix.

The activation solution can be a ready-to-use activation solution, such as the activation solution in the GEOSIL category (marketed by WOELLNER). The advantage is a simplification in the implementation since the activation solution no longer needs to be prepared on site.

The composition according to the invention can further contain one or several adjuvants, such as a superplasticiser (for example of the polyacrylate or lignosulfonate type), a water-repellent agent (for example heavy carboxylates of calcium, or with a silicone base), a water-retention agent or an anti-shrinkage agent. The term adjuvant means an addition, in particular of organic nature, with the purpose of modifying certain basic properties, in proportions less than 5% by weight of the composition. The composition can further include colorants or pigments.

The composition according to the invention can also contain one or several powdered mineral additives, chosen from kaolin, powdered unfired clay, zinc oxide, plaster, high aluminous cement, titanium oxide, an ettringite binder, a fluorosilicate such as sodium hexafluorosilicate, with the purpose of modifying certain basic properties, in a concentration preferably less than 20 parts by weight, more preferably between 0.5 and 10 parts by weight, for 100 parts by weight of the matrix, The powdered unfired clay can predominantly contain kaolinite or montmorillonite.

This invention also relates to various methods for producing a construction material using the basic composition described hereinabove. More particularly:

a method for producing a construction material comprising the mixing of the constituents of said composition with granulates chosen from fillers, powders, sand, chippings of gravel, and/or fibres, and optionally pigments:
- a method for producing a construction material that comprises the mixture of said composition with unfired clay, preferably in proportions that range up to 70% by weight, more preferably up to 60% by weight of the material, and cold extrusion or cold moulding of said mixture; the obtaining of the material is carried out without firing, contrary to conventional materials with a base of unfired clay which require firing at a temperature from about 900 to 1100° C.,
- a method for producing a construction material comprising the mixing of said composition with "granulates" or plant fibres, such as sawdust, wood chips and fibres, straw, shive, flax, cork or perlite;
- a method for producing an expanded construction material comprising the mixture of said composition with an expanding or foaming agent, such as aluminium powder, advantageously in the presence of a stabiliser.

All of these methods can be implemented at temperatures between about 0° C. and about 30° C., without requiring thermal treatment.

More precisely, the matrix, produced using the components presented hereinabove, is mixed with the activation solution, itself prepared according to the formula indicated. The two together thus form the composition according to the invention, having the form of a thick liquid, which is then mixed with one or several neutral compounds such as granulates or fibres, of which it will form the binder. The additives, added to the mixture, make it possible to provide it with certain particular additional properties. This binder, which resembles a resin, makes it possible after reaction, to form with the "granulates" and the "additives" a coherent monolithic assembly that has new properties with respect to the materials of prior art, in particular a short setting time, and very low dimensional shrinkage, a shiny surface appearance.

This present invention also relates to the possible multiple uses of said composition according to the invention or methods described hereinabove, and in particular:
- the use of said composition or of said method for the production of coating elements, in particular coatings for floors, such as tiles, slabs, stones or edges, coatings for walls, such as indoor or outdoor façade elements, facing plates, cladding elements, or coverings for roofs of the tile type, for the production of extruded or moulded construction modules, such as bricks, or for the production of varied extruded forms;
- the use of said composition or of said method for the production of composite materials, such as construction panels of the prefabricated panel type, of prefabricated blocks such as door or window lintels, prefabricated wall elements, or any other prefabricated construction element;
- the use of said composition with an expanding or foaming agent for the production of insulation modules, such as partition boards, or light insulating construction modules (of a density less than 1.5 kg/L, preferably less than 1.2 kg/L, more preferably less than 1.0 kg/L, more preferably less than 0.7 kg/L);
- the use of said composition for the production via additive manufacturing, such as by means of a 3D printer, of construction elements, buildings or homes, or decorative objects; or again
- the use of said composition in the form of a two-component system with either on the one hand the constituents in solid form, and on the other hand the constituents in liquid form, or the constituents in the form of two pastes, for the production of sealing mastic, glue or mortar, for example for injection using a device of the pistol type with cartridges each containing a portion of the components of the final composition.

These last two uses are very difficult to implement using compositions with a cement base due to the hydration reaction of this material as soon as it is mixed with water, which requires synchronisation between the adding of water, mixing and depositing the paste, This invention shall now be described in more detail and illustrated using non-limiting examples, hereinafter.

EXAMPLES

In the examples, the abbreviations in table 1 are used for the composition of the matrix:

TABLE 1

| Abbreviation | Component |
| --- | --- |
| MKF | Metakaolin flash |
| LHF | Granulated blast furnace slag |
| CVS | Fly ash of class F |
| CFX | Scraps from manufacturing Chamotte |
| CHX | Slaked Lime |
| WLS | Wollastonite |
| CCL | Glass powder |

The metakaolin forms the base from which the formulation is established. Several types of metakaolin exist in the market. Table 2 hereinbelow shows a few typical metakaolins.

TABLE 2

| | MKF N | MKF B | CFX | M1200S | M1000 | M501 |
| --- | --- | --- | --- | --- | --- | --- |
| Commercial name | Argicem | Argicem white | Chamotte FX | Argical M1200S | Argical M1000 | Metastar M501 |
| Supplier | Argeco | Argeco | Imerys | Imerys | Imerys | Imerys |
| Method | Calcination Flash | Calcination Flash | Manufacturing coproduct | AGS flash furnace | Rotary furnace | Rotary furnace |
| Colour | Salmon | Off-white | Light grey | White 74 | White 73 | White 83 |
| D50 (µm) | 20-40 | 20-40 | NA | 1-2 | 10-20 | 1-2 |
| Bulk density (kg/m3) | 700 | 560 | NA | 250 | 550 | 350 |
| Chapelle Index (mg Lime/g) | 800 | 800 | NA | 1400 | 1000 | 1000 |
| Water demand (g/kg) | <600 | <600 | NA | 1650 | 900 | NA |

(NA: not applicable or not determined)
(water demand; measured in a Marsh funnel)

The chamotte FX is a manufacturing coproduct, this is dust emitted during the manufacture of metakaolin or of chamotte in a rotary furnace. These dusts are captured by a filtration system and conditioned. As "quasi waste", they have a very low environmental impact and a competitive economic cost.

The two Argeco metakaolins are produced according to the method, of the Argeco Développement company, of flashing described hereinabove. Produced from an impure clay according to a method that does not consume much energy, their environmental impact and their cost are low.

The Metastar 501 and Argical M1000 metakaolins are produced using a very pure kaolinite according to the conventional method of calcination with a ball in a rotary furnace and crushing. They are much more expensive than the preceding products.

Finally, Argical M 1200S is produced using very pure dried and crushed kaolinite in a so-called flash furnace according to the method of Imerys. This method is different from the Argeco method and does not comprise a fast cooling step (of the quenching type). The final product is very expensive due to its purity and the method of manufacture. The reactivity to the lime is however very high.

Table 3 hereinbelow shows the results of the reactivity tests of the various types of metakaolin. This test is carried out according to a simple protocol: to a given quantity of metakaolin is added a sufficient quantity of activation solution (sodium silicate of the N type and soda at 32%, with a $SiO_2/Na_2O$ molar ratio of 1.15) then a given quantity of fine granulates (sand and filler). The mortar obtained must be rather liquid and there is no granular optimisation in order to correctly distinguish the performance of the metakaolin.

The formulations of the examples hereinafter are primarily based on the MKF N from Argeco and the CFX from Imerys.

The "flashed" metakaolin used MKF N of the brand ARGICEM® from Argeco Développement is a product that has a high BET specific surface area (between 5 and 16 $m^2/g$ (NF ISO 9277). Its average granulometry is D50=20-30 μm according to the standard NF P 18-513 and it has a low water demand between 300 and 500 g/kg (measured according to the Marsh funnel method).

In all of the examples hereinafter the alkaline silicate as well as the alkaline base are in aqueous solution, the concentrations thereof are expresses as a % by weight in this solution. Most of the time no adding of water other than the water of these solutions that constitute the activation solution is required. The quantity of water is therefore as reduced as possible. The weight ration of the water E over the total dry matter MSR of the binding composition (here denoted as "resin", or binder) is more preferably less than 1, but variable according to the type of matrix. For example E/MSR is advantageously less than 0.6 for a matrix constituted of flashed metakaolin alone, and an E/MSR ratio close to 0.8 for a matrix containing a mixture of flashed metakaolin and unflashed metakaolin.

Example 1

Table 4 hereinafter shows varied compositions according to the invention: FR01 to FR11, with an indication of the $SiO_2/M_2O$ molar ratio of the activation solution and an indication of the X/M ratio in mol/kg (total sum in $SiO_2$+ $M_2O$ moles of the activation solution per kg of matrix).

TABLE 3

| Type Metakaolin | MKF N | MKF B | CFX | M1200S | M1200S | M1000 | M501 |
|---|---|---|---|---|---|---|---|
| Qty Metakaolin (g) | 100 | 100 | 100 | 100 | 100 | 100 | 100 |
| Qty Activation solution (g) | 100 | 120 | 100 | 220 | 100 | 130 | 210 |
| Qty Granulates (g) | 200 | 200 | 200 | 200 | 200 | 200 | 200 |
| Qty of Additional Water (g) | 0 | 0 | 0 | 0 | 75 | 0 | 0 |
| X/M (mol/kg) | 4.9 | 5.9 | 4.9 | 10.8 | 4.9 | 6.4 | 10.3 |
| $R_C$ at 28 days (MPa) | 35 | 23 | 25 | 27 | <1 | 35 | 28 |

Table 3 shows that metakaolin of the MKF N type (Argicem) has the best mechanical performance for a lower quantity of activation solution.

The granulometry and the particular water demand of Argical M1200S and Metastar 501 metakaolins have the consequence of requiring a very large quantity of catalyst (i.e. alkaline activation solution). At an equivalent quantity of catalyst, the rheology linked to the use of M1200S requires adding a substantial quantity of water with respect to MKF N, which dilutes the catalyst and fully inhibits the reaction.

The activation solution represents a non-negligible portion in the price and in the environmental impact, the formulations with a base of metakaolin MKF N and CFX therefore have the lowest costs and environmental impacts.

The mechanical performance, obtained after mixing the binding composition (denoted here as "resin", or binder) with the granulates, then moulding and maturing time at a temperature of 20° C. are given in terms of resistance to compression for a cylinder 40 mm in diameter for 80 mm in height. Contrary to the formulas given further on in the applications, the granulates used in these formulas have only a neutral filling role and the stacking thereof was therefore not optimised.

Tempo 12 is a water reducer marketed by Sika, of the polyacrylate type.

The fine sand is Fontainebleau fine sand with a granulometry less than or equal to 1 mm, the fine limestone powder has a granulometry less than 200 μm, In this example the setting (setting <24 h) was visually estimated.

TABLE 4

| | | | | FR01 | FR02 | FR03 | FR04 | FR05 | FR06 |
|---|---|---|---|---|---|---|---|---|---|
| Composition of the Resin | Matrix | MKF | (% Mass) | 50 | 49 | 47 | 51 | 50 | 47 |
| | | LHF | (% Mass) | | | | | | |
| | | CVS | (% Mass) | | | | | | |
| | | CFX | (% Mass) | | | | | | |
| | | CHX | (% Mass) | | 2 | | | | |
| | | WLS | (% Mass) | | | | 6 | 1 | |
| | | CCL | (% Mass) | | | | | | 6 |
| | Activation solution | Alkaline silicate | Molar ratio | 3.384 | 3.384 | 3.384 | 3.384 | Am Silica | 3.384 |
| | | | (% SiO2) | 26.2 | 26.2 | 26.2 | 26.2 | 100 | 26.2 |
| | | | (% MS) | 34.2 | 34.2 | 34.2 | 34.2 | 100 | 34.2 |
| | | | Qty (%) | 34 | 33 | 31 | 34 | 9 | 31 |
| | | Alkaline base | Type | NaOH | NaOH | NaOH | NaOH | NaOH | NaOH |
| | | | (% Mass) | 32 | 32 | 32 | 50 | 32 | 32 |
| | | | (mol M2O/kg) | 4 | 4 | 4 | 6.25 | 4 | 4 |
| | | | Qty (%) | 16 | 16 | 16 | 11 | 28 | 16 |
| | | Global Ratio | SiO2/M2O | 1.376 | 1.352 | 1.302 | 1.318 | 1.339 | 1.302 |
| | Additional Water | | (% Mass) | | | | | 3 | 13 |
| | Ratio X/M | | mol/kg | 5.127 | 4.915 | 4.516 | 5.021 | 5.240 | 4.516 |
| Composition and Performance of the Monolith Test | Resin | | % | 49.2 | 50.0 | 51.0 | 49.4 | 49.7 | 52.9 |
| | Tempo 12 | | % | 0.8 | 0.8 | 1.0 | 0.5 | 0.8 | 0.3 |
| | Fine Sand | | % | 35.0 | 35.0 | 35.0 | 35.4 | 35.0 | 35.2 |
| | Filler Lime | | % | 15.0 | 14.2 | 14.0 | 14.7 | 14.5 | 11.6 |
| | Setting <24 H | | Visual | OK | OK | OK | OK | OK | OK |
| | RC D + 7 | | MPa | | 30.2 | 30 | | 23 | |
| | RC D + 28 | | MPa | | | | | | >40 |
| | RC D + 56 | | MPa | 31.4 | 35 | 37.3 | 31 | 30 | >40 |

| | | | | FR07 | FR08 | FR09 | FR10 | FR11 |
|---|---|---|---|---|---|---|---|---|
| Composition of the Resin | Matrix | MKF | (% Mass) | 35 | 40 | 50 | 49 | 30 |
| | | LHF | (% Mass) | | 10 | | | |
| | | CVS | (% Mass) | | | | | 20 |
| | | CFX | (% Mass) | 15 | | | | |
| | | CHX | (% Mass) | | | | 3 | |
| | | WLS | (% Mass) | | | | | |
| | | CCL | (% Mass) | | | | | |
| | Activation solution | Alkaline silicate | Molar ratio | 3.384 | 3.384 | 3.384 | 1.691 | 3.384 |
| | | | (% SiO2) | 26.2 | 26.2 | 26.2 | 27.5 | 26.2 |
| | | | (% MS) | 34.2 | 34.2 | 34.2 | 44.3 | 34.2 |
| | | | Qty (%) | 34 | 34 | 34 | 33 | 34 |
| | | Alkaline base | Type | NaOH | NaOH | KOH | NaOH | NaOH |
| | | | (% Mass) | 32 | 32 | 45 | 32 | 32 |
| | | | (mol M2O/kg) | 4 | 4 | 4 | 4 | 4 |
| | | | Qty (%) | 16 | 16 | 16 | 8 | 16 |
| | | Global Ratio | SiO2/M2O | 1.376 | 1.376 | 1.376 | 1.246 | 1.376 |
| | Additional Water | | (% Mass) | | | | 7 | |
| | Ratio X/M | | mol/kg | 5.127 | 5.127 | 5.127 | 5.244 | 5.127 |
| Composition and Performance of the Monolith Test | Resin | | % | 49.1 | 49.8 | 48.9 | 50.1 | 49.4 |
| | Tempo 12 | | % | 0.9 | 0.2 | 0.2 | 1.0 | 0.6 |
| | Fine Sand | | % | 35.6 | 35.4 | 34.6 | 34.6 | 35.6 |
| | Filler Lime | | % | 14.4 | 14.6 | 16.3 | 14.3 | 14.4 |
| | Setting <24 H | | Visual | OK | OK | OK | OK | OK |
| | RC D + 7 | | MPa | >20 | | 33.7 | 31.5 | >25 |
| | RC D + 28 | | MPa | | | 38.8 | | |
| | RC D + 56 | | MPa | 28 | >40 | | 31.5 | >35 |

Example 2

Table 5 hereinafter shows the formulations FR-N1 and FR-N2 which have lower performance than those of the example 1. It was observed that the resin composition FR_N1 is highly alkaline and produces efflorescences, and the composition FR-N2 with an X/M ratio greater than 2 has a low mechanical resistance (Rc at 28 days <5 MPa). This example shows the importance of the preferred $SiO_2/M_2O$ and X/M ratios, in order to improve the properties of materials prepared using the composition according to the invention and the performance thereof.

TABLE 5

|  |  |  |  | FR_N1 | FR_N2 |
|---|---|---|---|---|---|
| Composition of the Resin | Matrix | MKF |  | 50 | 40 |
|  |  | CVS |  |  | 10 |
|  | Activation solution | Alkaline silicate | Molar ratio | 3.384 | 3.384 |
|  |  |  | (% $SiO_2$) | 26.2 | 26.2 |
|  |  |  | (%) | 34.2 | 34.2 |
|  |  |  | Qty (%) | 10 | 13 |
|  |  | Alkaline base | Type | NaOH | NaOH |
|  |  |  | (%) | 32 | 32 |
|  |  |  | (mol $M_2O$/kg) | 4 | 4 |
|  |  |  | Qty (%) | 40 | 7 |
|  |  | Global Ratio | $SiO_2/M_2O$ | 0.253 | 1.268 |
|  | Additional Water |  |  |  | 30 |
|  | Ratio X/M |  | mol/kg | 4.331 | 2.031 |

The following examples show various applications (non-limiting) that implement the base composition according to this invention.

Example 3: Construction Blocks

In order to produce construction elements such as, for example, building blocks, edging or other prefabricated elements, the composition according to the invention is mixed with granulates of the filler, sables, chippings and gravel type in an optimum manner by complying with the typical formulation rules in order to obtain a granular stack that has a maximum compactness.

Table 6 herein below gives two typical formulations of mortar (HP2A-B1 and HP2A-B2 produced with standardised sand (ISO 679:2003, according to the standard EN 196-1) as well as a comparison with a mortar with a Portland cement base (left column). The mechanical performance as well as the environmental impacts are indicated.

TABLE 6

|  |  |  | Cement | HP2A_B1 | % Diff vs. Cement | HP2A_B2 | % Diff vs. Cement |
|---|---|---|---|---|---|---|---|
| Formulation | Portland Cement CEM 1525N | Quantity (g) | 450 |  |  |  |  |
|  | Flashed Metakaolin | Quantity (g) |  | 211 |  | 138 |  |
|  | Granulated Blast Furnace Slag | Quantity (g) |  | 91 |  | 138 |  |
|  | Sodium Silicate | Molar Ratio |  | 3.384 |  | 3.384 |  |
|  |  | Concentration (%) |  | 34.2 |  | 34.2 |  |
|  |  | Quantity (g) |  | 196 |  | 192 |  |
|  | Sodium Hydroxide | Concentration (%) |  | 30 |  | 30 |  |
|  |  | Quantity (g) |  | 106 |  | 82 |  |
|  | Water | Quantity (g) | 225 |  |  |  |  |
|  | Standardised Sand | Quantity (g) | 1350 | 1350 |  | 1350 |  |
|  | HP2A Resin Parameters | $SiO_2/M_2O$ global ratio | NA | 1.316 |  | 1.610 |  |
|  |  | X/M Ratio (mol/kg) | NA | 4.988 |  | 5.049 |  |
| Performance | Setting 2H | Qualitative | Low | Medium |  | High |  |
|  | Setting 12H | Qualitative | Medium | High |  | High |  |
|  | Resistance to compression | After 28 D (20° C.) | >40 MPa | >40 MPa |  | >40 MPa |  |
| Environmental Impacts For 1 T of concrete produced | Total energy | MJ | 1103 | 1067 | −3.2 | 944 | −14.4 |
|  | Oil Equivalent | TEP | 0.0263 | 0.0255 | −3.2 | 0.0225 | −14.4 |
|  | RM Global ADP (excluding energy) | kg Sb | 0.0281 | 0.0182 | −35.3 | 0.0170 | −39.8 |
|  | Climate Heating | kg $CO_2$ eq | 201.7 | 75.0 | −62.8 | 68.5 | −66.1 |
|  | Acidification | kg $SO_2$ eq | 0.5441 | 0.4460 | −17.9 | 0.422 | −22.2 |
|  | Eutrophisation | kg $PO_4$ eq | 0.0591 | 0.0345 | −41.6 | 0.0317 | −46.3 |
|  | Photochemical Ozone | kg $C_2H_4$ eq | 0.0470 | 0.0418 | −11.2 | 0.0372 | −20.9 |
|  | Human Toxicity | kg DCB eq | 0.6618 | 0.5596 | −12.4 | 0.5202 | −21.4 |

In the environmental impact parameters of this table the meanings are: RM: raw materials; ADP: Abiotic Depletion Potential; Sb: antimony; Human toxicity kg DCB eq: toxicity for Humans expressed in dichlorobenzene equivalent.

The impact values are here calculated using in particular data from ADEME, the American EPA, Life Cycle Analyses from the suppliers and from the Portland Cement Association. A certain number of points however have penalized the technology of this invention in the calculations of this table: the impact of water was not counted for the formula with a cement base, the method of calculation per tonne of concrete produced favours the formula with cement due to the adding of water and the impact data for the sodium silicate reagent date before 2000 for a factory without fume treatment. Currently, in Western Europe sodium silicate production factories have been brought to standard and without a doubt have much less impact on the environment. Despite these penalties, it is observed that the environmental impact of a material produced according to the invention is much less than a conventional material and in particular on $CO_2$.

Example 4

In this example various formulations are presented (HP2A-P01 to HP2A-P08) in order to produce 1 kg of concrete according to the invention in order to create in particular construction elements of the building block type using a press, or any other application that uses a paste of the concrete type. The mechanical performance is also indicated in table 7 which groups these formulations together.

TABLE 7

| | | | | HP2A_P01 | HP2A_P02 | HP2A_P03 | HP2A_P04 | HP2A_P05 | HP2A_P06 | HP2A_P07 | HP2A_P08 |
|---|---|---|---|---|---|---|---|---|---|---|---|
| Resin | Matrix | MKF | Quantity (g) | 133 | 150 | 69 | 84 | 71 | 75 | 99 | 73 |
| | | LHF | Quantity (g) | | 30 | 56 | 48 | 40 | 42 | 49 | 59 |
| | Activation Solution | Alkaline Silicate | Molar Ratio | 3.384 | 3.384 | 3.384 | 3.384 | 3.384 | 3.384 | Geosil SB | 3.384 |
| | | | Wt. % | 34.2 | 34.2 | 34.2 | 34.2 | 34.2 | 34.2 | | 34.2 |
| | | | Quantity (g) | 89 | 120 | 83 | 88 | 74 | 79 | 104 | 95 |
| | | Alkaline Base | Type | NaOH | NaOH | NaOH | NaOH | NaOH | NaOH, KOH | | NaOH |
| | | | Wt. % | 32 | 32 | 32 | 32 | 32 | 24 and 11 | | 32 |
| | | | Quantity (g) | 44 | 60 | 42 | 44 | 40 | 40 | | 37 |
| | Additive | | Type | Tempo 12 | Tempo 12 | LGS 50 | LGS 50 | LGS 50 | LGS 50 | | Tempo 12 |
| | | | Quantity (g) | 5 | 4 | 8 | 9 | 7 | 8 | | 3 |
| | Water | | Quantity (g) | | | | | | | 44 | |
| HP2A parameters | SiO2/M2O Global Ratio | | | 1.336 | 1.327 | 1.317 | 1.327 | 1.265 | 1.321 | | 1.533 |
| | X/M Ratio (mol/kg) | | | 5.109 | 5.105 | 5.100 | 5.105 | 5.213 | 5.187 | | 5.193 |
| Filler | Powdered Clay | Quantity (g) | | 45 | 121 | | 63 | | 12 | | |
| | Rock 0/200 | Quantity (g) | | | | 52 | | 66 | 50 | | |
| | Lime 0/200 | Quantity (g) | | | | | | | | 86 | |
| Fine Sands | Fine 0/1 | Quantity (g) | | | | | | | | 618 | 147 |
| | White 0/1 | Quantity (g) | | | | 78 | 77 | 81 | 79 | | |
| | Yellow 0/2 | Quantity (g) | | 240 | 61 | | | | | | |
| | Pink 0/2 | Quantity (g) | | | | 391 | 248 | 264 | 394 | | 293 |
| | Yellow 0/4 | Quantity (g) | | 444 | 454 | | | | | | |
| | Pink 0/4 | Quantity (g) | | | | | | | | | |
| Medium | Pink 2/4 | Quantity (g) | | | | 221 | 339 | 357 | 221 | | 293 |
| Total for 1 kg of Concrete | Granulates (g) | | | 729 | 636 | 742 | 727 | 768 | 756 | 704 | 733 |
| | Matrix + Activation solution (g) | | | 266 | 360 | 250 | 264 | 225 | 236 | 252 | 264 |
| Performance | Setting at 24 H | Visual | | OK | OK | OK | OK | OK | OK | OK | OK |
| | Resistance to Compression (MPa) | at 7 D | | | | | 39 | 27 | 25 | 24 | |
| | | at 14 D | | | | | | | | 30 | >40 |
| | | at 28 D | | 28 | 32 | | | | | >35 | >40 |

LGS 50 is a solution of the TEMBEC brand of Sodium Lignosulfonate at 50%. Among the fillers tested, unfired clay powder (non-calcined), lime powder, or rock powder (porphyry) have a granulometry less than 200 μm.

For sands, various colours and granulometries (fine or medium, expressed in mm) were used.

Moreover, it was surprisingly observed that adding kaolinite or montmorillonite, in a small quantity in relation to the matrix, for example a few parts (less than 10 parts) by weight for 100 parts by weight of matrix, in the form of powder (granulometry less than 200 μm), contributes in particular to a sharp increase in mechanical performance. This is the case in particular of the resistance to compression that reaches or exceeds 30 MPa at 5 days and exceeds 40 MPa at 28 days in the HP2A-P12 and HP2A-P13 compositions (in comparison respectively with 24 MPa at 5 days and 35 MPa at 28 days for a formulation without these additives: HP2A-P11). The results are grouped together in table 8.

TABLE 8

| | | | | HP2A_P11 | HP2A_P12 | HP2A_P13 |
|---|---|---|---|---|---|---|
| Resin | Matrix | MKF | Quantity (g) | 147 | 147 | 147 |
| | Activation Solution | Alkaline Silicate | Molar Ratio | 3.384 | 3.384 | 3.384 |
| | | | Wt. % | 34.2 | 34.2 | 34.2 |
| | | | Quantity (g) | 97 | 97 | 97 |

TABLE 8-continued

|  |  |  | HP2A_P11 | HP2A_P12 | HP2A_P13 |
|---|---|---|---|---|---|
|  | Alkaline Base | Type | NaOH | NaOH | NaOH |
|  |  | Wt. % | 32 | 32 | 32 |
|  |  | Quantity (g) | 50 | 50 | 50 |
|  | Additive | Type |  | Kaolinite | Montmorillonite |
|  |  | Quantity (g) |  | 12 | 12 |
|  | Adjuvant (Tempo 12) | Quantity (g) | 7 | 7 | 7 |
|  | HP2A Parameters | SiO2/M2O Global Ratio | 1.303 | 1.303 | 1.303 |
|  |  | X/M Ratio (mol/kg) | 5.093 | 5.093 | 5.093 |
| Granulates | Filler | Rock 0/200 Quantity (g) | 56 | 44 | 44 |
|  | Fine Sands | Fine-0/1 Quantity (g) | 66 | 66 | 66 |
|  |  | Pink-0/2 Quantity (g) | 369 | 369 | 369 |
|  | Medium | Pink-2/4 Quantity (g) | 208 | 208 | 208 |
| Total for 1 kg of Concrete | Granulates (g) |  | 699 | 687 | 687 |
|  | Matrix-Activation solution (g) |  | 294 | 294 | 294 |
| Performance | Setting at 24 H | Visual | OK | OK | OK |
|  | Resistance to Compression (MPa) | at 5 D | 24 | 34 | 30 |
|  |  | at 28 D | 35 | >40 | >40 |

Example 5: Fabrication of Moulded Forms

Thanks to its low dimensional shrinkage, the composition according to the invention makes it possible to produce very precise moldings of all shapes making it possible to manufacture in particular tiles of large size, moulded tiles or various decorative moulded forms. Although it increases the setting speed, the presence of blast furnace slag however increases the dimensional shrinkage. This parameter has to be taken into account in the case of a possible use of formulas containing more than 30% slag, The surface treatment of the products obtained can be carried out after the setting in order to obtain, for example, a water repellent effect or to increase the hardness thereof. Likewise, the colour can be modified by adding suitable pigments. Table 9 hereinbelow provides two examples of formulations (HP2A-M01 and HP2A-M02) that can be used for applications of this type with the results obtained in terms of colour, Mohs hardness, beading effect and mechanical performance.

The abbreviation "Pieri H 2000" corresponds to the water-repellent surface agent, of the Grace brand, Pieri Hydroxi 2000 which provides excellent results. For the colours, all sorts of mineral pigments can be used: iron oxides, ochres, etc.

TABLE 9

|  |  |  |  | HP2A_M01 | HP2A_M02 |
|---|---|---|---|---|---|
| Resin | Matrix | MKF | Quantity (g) | 186 | 105 |
|  |  | LHF | Quantity (g) |  | 56 |
|  | Activation Solution | Silicate | Molar Ratio | 3.384 | 3.384 |
|  |  |  | Wt. % | 34.2 | 34.2 |
|  |  |  | Quantity (g) | 124 | 107 |
|  |  | Alkaline | Type | NaOH | NaOH |
|  |  |  | Wt. % | 32 | 32 |
|  |  |  | Quantity (g) | 62 | 52 |
|  |  | Additive 1 | Type | Tempo 12 | Tempo 12 |
|  |  |  | Quantity (g) | 2 | 4 |
|  |  | Pigment | Type |  | Active Charcoal |
|  |  |  | Quantity (g) |  | 25 |
|  | HP2A Parameters | SiO2/M2O Global Ratio |  | 1.327 | 1.350 |
|  |  | X/M Ratio (mol/kg) |  | 5.105 | 5.052 |
| Granulates | Filler | Powdered Clay | Quantity (g) | 125 |  |
|  | Fines | White - 0/1 | Quantity (g) |  | 93 |
|  |  | Yellow - 0/2 | Quantity (g) | 188 |  |
|  |  | Pink - 0/2 | Quantity (g) |  | 372 |
|  |  | Yellow - 0/4 | Quantity (g) | 313 |  |
|  | Medium | Pink - 2/4 | Quantity (g) |  | 186 |
| % Global |  | Granulates |  | 626 | 651 |
|  |  | Matrix + Activation Solution |  | 372 | 320 |
| Additional Treatment Surface |  |  | Type | Water repellent | Water repellent |
|  |  |  | Name | Pieri H 2000 | Pieri H 2000 |
|  |  |  | Mode | Spraying | Spraying |
|  |  |  | Dose (g/m2) | 200 | 200 |

TABLE 9-continued

|  |  | HP2A_M01 | HP2A_M02 |
|---|---|---|---|
| Finished Product Results | Colours | Ground | Anthracite |
|  | Beading Effect | Excellent | Excellent |
|  | Mohs Hardness | 3 | 3 |
|  | Setting 24 H | OK | OK |
|  | Resistance to Compression (28 D) | 27 MPa | 35 MPa |

Example 6: Manufacture of Extruded Elements

The composition according to the invention, due to its compatibility with unfired clays, makes it possible to produce forms via cold extrusion. The very fast setting speed has to be taken into account when using the method especially in the case of the presence of accelerating components. Sold forms as well as hollow forms can be produced, with the paste to be extruded having a behaviour that is very close to pastes of conventional unfired clays.

As with the other applications, pigments or other adjuvants can be added for the purpose of obtaining a particular effect. Moreover, after hardening, the products can also be subjected to a surface treatment. Table 10 provides two examples of formulations (HP2A-X01 and HP2A-X02) that can be applied in extrusion as well as the mechanical performance obtained.

TABLE 10

|  |  |  |  | HP2A_X01 | HP2A_X02 |
|---|---|---|---|---|---|
| Resin | Matrix | MKF | Quantity (g) | 168 | 181 |
|  |  | MHF | Quantity (g) |  | 45 |
|  | Activation Solution | Alkaline Silicate | Molar Ratio | 3.384 | 3.384 |
|  |  |  | Wt. % | 34.2 | 34.2 |
|  |  |  | Quantity (g) | 109 | 153 |
|  |  | Alkaline Base | Type | NaOH | NaOH |
|  |  |  | Wt. % | 32 | 30 |
|  |  |  | Quantity (g) | 59 | 74 |
|  |  | Additive | Type | Tempo 12 | Tempo 12 |
|  |  |  | Quantity (g) | 7 | 6 |
|  | HP2A Parameters |  | SiO2/M2O Global Ratio | 1.264 | 1.407 |
|  |  |  | X/M Ratio (mol/kg) | 5.075 | 5.058 |
| Granulates | Powdered Clay |  | Quantity (g) | 285 | 541 |
|  | Fine Sand Blanc - 0/1 |  | Quantity (g) | 372 |  |
| % Global of the Paste to be Extruded | Granulates |  |  | 65.7 | 54.1 |
|  | Matrix + Activation solution |  |  | 33.6 | 45.3 |
|  | Unfired Earth |  |  | 28.5 | 54.1 |
|  | Total Clays |  |  | 45.3 | 72.2 |
| Performance | Setting at 24 H |  | Visual | OK | OK |
|  | Resistance to Compression (MPa) |  | at 7 D | >30 | 28 |
|  |  |  | at 28 D | >30 | >30 |

The percentages are weight percentages.

Example 7: Manufacture of Expanded Blocks

The method according to this invention allows for the production of expanded blocks by adding to the paste a reagent such as aluminium powder, a foaming agent as well as a foam stabiliser. The aluminium powder is introduced just before the end of mixing. The interest in using a composition according to the invention is in particular linked to the setting speed that makes it possible to avoid curing.

Table 11 provides three examples of formulations (HP2A-SP01 to HP2A-SP03) with the results obtained in particular the mechanical performance and the density of the finished product (before and after maturation).

The formulation HP2A-SP03 (left column) furthermore includes sawdust (medium: 1-5 mm environ) which makes it possible to obtain a composite material containing plant "granulates".

TABLE 11

|  |  |  |  | HP2A_SP01 | HP2A_SP02 | HP2A_SP03 |
|---|---|---|---|---|---|---|
| Resin | Matrix | MKF | Quantity (g) | 180 | 120 | 330 |
|  |  | LHF | Quantity (g) | 70 | 80 | 120 |

TABLE 11-continued

|  |  |  | HP2A_SP01 | HP2A_SP02 | HP2A_SP03 |
|---|---|---|---|---|---|
| Activation Solution | Silicate | Molar Ratio | 3.384 | 3.384 | 3.384 |
|  |  | Wt. % | 34.2 | 34.2 | 34.2 |
|  |  | Quantity (g) | 172 | 130 | 300 |
|  | Alkaline | Type | NaOH | NaOH | NaOH |
|  |  | Wt. % | 32 | 32 | 32 |
|  |  | Quantity (g) | 83 | 70 | 150 |
| Additive 1 |  | Type | Tempo 12 | Triton X | Tempo 12 |
|  |  | Quantity (g) | 4 | 2.5 | 6 |
| Additive 1 |  | Type |  | Emulsion Stab |  |
|  |  | Quantity (g) |  | 3.5 |  |
| Additive 1 |  | Type |  | Al Powder |  |
|  |  | Quantity (g) |  | 0.8 |  |
| HP2A Parameters | $SiO_2/M_2O$ Global Ratio |  | 1.356 | 1.268 | 1.327 |
|  | X/M Ratio (mol/kg) |  | 5.220 | 5.077 | 5.105 |
| Granulates | Powdered Clay | Quantity (g) | 50 |  |  |
|  | Perlite (ml) | Volume (ml) | 1000 |  |  |
|  | Sawdust (Medium) | Quantity (g) |  |  | 800 |
|  | Lime Powder 0/200 μm | Quantity (g) |  | 400 |  |
| Results | Density | kg/L | 1.1 | 0.9 | 1.8 |
|  | Resistance to compression | at 28 D | >10 MPa | >5 MPa | 15 MPa |

Example 8: Application for Glues and Mastic

The composition according to the invention can be implemented in the form of a two-component formulation to be mixed at the time of use: two examples (HP2A-COL01 and HP2A-COL02) are provided in table 12, with different components A and B, as well as the examples HP2A-COL3 and HP2A-COL04 in table 13.

Applications for sealing glues, mastics, and mortars can as such be entirely considered, with a very practical implementation for the user, comprising the reaction by mixing two components A and B in the form of ready-to-use pastes.

Geosil SB is a ready-to-use activation solution marketed by WOELLNER, containing the alkaline silicate and the alkaline base.

Lime: this here is a fine lime powder with a granulometry less than 200 μm or 315 μm.

TABLE 12

|  |  | HP2A_COL01 | | HP2A_COL02 | |
|---|---|---|---|---|---|
|  |  | Component A | Component B | Component A | Component B |
| Flashed Metakaolin | Quantity (g) | 100 |  |  | 50 |
| Blast Furnace Slag | Quantity (g) |  |  |  | 50 |
| Alkaline Silicate | Molar Ratio | 3.384 |  | Geosil SB |  |
|  | Wt. % | 34.2 |  |  |  |
|  | Quantity (g) | 65 |  | 100 |  |
| Alkaline Base | Type |  | NaOH |  |  |
|  | Wt. % |  | 30 |  |  |
|  | Quantity (g) |  | 35 |  |  |
| Additive | Type | Tempo 12 | Tempo 12 | Tempo 12 | Tempo 12 |
|  | Quantity (g) | 1 | 2 | 2 | 2 |
| Water | Quantity (g) |  |  |  | 40 |
| Lime | Quantity (g) |  | 100 | 100 |  |
| Setting 24 H | Visual | Yes | | Yes | |
| Resistance to compression | at 28 D | >25 MPa | | >30 MPa | |

In the two examples of table 12, the ratio global $SiO_2/M_2O$ of the alkaline solution is 1.25 and the X/M ratio is 5.1 mole/kg of matrix.

Two other formulations of glues according to the invention are presented in table 11 hereinafter.

TABLE 13

|  |  | HP2A COL 03 | | HP2A COL 04 | |
|---|---|---|---|---|---|
|  |  | Powder | Liquid | A | B |
| Formulation | MKF N | 291 |  | 330 |  |
|  | Slag | 72 |  |  |  |
|  | Silicate N |  | 240 | 215 |  |
|  | Soda 32% |  | 134 |  | 109 |
|  | Water |  |  |  | 7 |
|  | Sika G-225 | 1 |  |  |  |
|  | Tempo 12 |  |  | 3 | 6 |
|  | Lime 0/315 | 254 |  |  | 330 |
|  | Kaolinite | 8 |  |  |  |
|  | Total | 626 | 374 | 548 | 452 |
| Properties | Setting at 20° C. (h) | 5 | | 6 | |
|  | $R_C$ D + 28 (MPa) | >35 | | >25 | |
| Alkaline solution | SiO2/M2O | 1.239 | | 1.316 | |
|  | X/M (mol/kg) | 5.217 | | 5.007 | |

The Sika® G-225 additive is a thinner of the polycarboxylate type.

The Tempo 12 additive is a superplasticiser with an acrylic copolymer base.

Such 100% mineral glues have the advantage of non-flammability and an absence of Volatile Organic Compounds, with respect to glues containing organic products and/or solvents. They are furthermore compatible with the other mineral construction elements and make it possible to produce, for example by injection by means of two cartridges respectively containing the components A and B, an operation of the repair type, of joining construction elements (sealing) or coating of a surface.

Example 9: Composition with Light Granulates

Materials with a low density such as, for example, hemp, wood fibre, expanded clay, pozzolana or perlite are porous. This often results in a problem of cohesion when they are bonded with a hydraulic binder. Indeed, the migration of the water inside the granulate decreases the output of the hydraulic setting reaction in particular at the interface between the granulate and the binding phase. However the geopolymerisation reaction does not consume but produces water. The migration of the water to the granulates will therefore not produce this lack of cohesion.

The other advantages of geopolymers on this application are in particular the good adhesive properties, the very low shrinkage when drying, the inhibition of mould and the repulsive nature for rodents and insects (due to the alkalinity and the presence of carbonates, as well as very high flame-retardant capacities.

Several formulations have therefore been tested that include shive (hemp), or perlite. Table 14 herein below shows a few examples.

TABLE 14

|  |  | PERL02 | CHEN01 | CHEN03 |
|---|---|---|---|---|
| Binder | MKF N | 170 | 475 | 478 |
|  | LHF | 100 |  | 192 |

TABLE 14-continued

|  |  | PERL02 | CHEN01 | CHEN03 |
|---|---|---|---|---|
|  | Silicate N | 170 | 295 | 430 |
|  | Soda 30% | 100 | 185 | 162 |
|  | Potash 45% |  |  | 76 |
|  | Tempo 12 | 4 | 5 | 7 |
|  | Argilus Dry Clay |  | 40 | 190 |
| Granulates | Perlite | 161 |  |  |
|  | Shive |  | 195 | 270 |
|  | Hemp fibres |  |  | 5 |
| Volume | Binder volume (ml) | 300 | 550 | 850 |
|  | Granulate volume (ml) | 1000 | 1500 | 2150 |
|  | Binder/total volume ratio | 0.23 | 0.27 | 0.28 |
| Ratio | SiO2/M2O | 1.25 | 1.20 | 1.28 |
|  | RCM (mol/kg) | 4.95 | 4.98 | 5.00 |
| Properties | Density (kg/L) | 850 | 650 | 680 |
|  | RC D + 28 (MPa) | 14 |  |  |
|  | Flammability (cigarette lighter test) | no | no | no |

It is therefore observed that it is possible to obtain composites that have good performance with low volumes of binder, less than what is usually practiced for conventional binders.

For the composite with a perlite base, the resistance to compression is greater than a building block of class B80 (8 MPa) and is largely sufficient for the block to be able to be considered as a supporting block. There is therefore a margin for manoeuvre for inserting empty spaces up to 50% in a block produced according to the formula PERL02. A supporting block is as such obtained, of a class between a B40 and B60, having an apparent density of approximately 400 kg/m3, i.e. more than 2 times less than the apparent density of a concrete building block B40 (900 kg/m3).

The densities for shive blocks are very satisfactory, the shive fibres are highly integral with the whole and resist pulling off well, including at the angles. Their solidity is sufficient to build large-size insulation plates to be screwed or glued.

In summary, tables 15 and 16 hereinafter group together the various advantages observed by the inventors between the materials obtained by the method according to this invention and respectively the method implementing Portland cement (table 15) and methods using terra-cotta (table 16).

TABLE 15

| Properties | Portland Cement | Invention |
|---|---|---|
| Setting time | >3 h | 10-60 min |
| Time to obtain 50% of Rc28D | 7-14 D | 1-2 D |
| Fire performance | 650° C. | 1000° C. |
| Flame retardant effect | Low | High |
| Resistance to sulphate ions | Low | Very high |
| Resistance to chloride ions | Medium | Very high |
| Anticorrosion Protection of the steel frames | Middle term | Long term |
| Dimensional shrinkage | Medium | Very low |
| Adhesive properties in stone material | Medium | Very high |
| Ability to integrate clay into the formulations | Very low | Substantial |
| Mechanical performance with organic materials | Medium | Very good |
| Steam exchange capacity | Low | Substantial |
| Shiny appearance of the surface | Non | Yes |
| Consumption of natural resources (including energy) | Medium | Low |
| Environmental impact (CO2, SO2, etc.) | High | Low |

TABLE 16

| Properties | Terra-cotta | Invention |
| --- | --- | --- |
| Complexity of the installation | High | Low |
| Manufacturing operation | Firing | Ambient temp. |
| Compatibility with varied granulates (plant fibres, etc.) | Non | Yes |
| Variety of forms that can be produced | Low | Substantial |
| Variety of colours that can be produced | Low | Substantial |
| Dimensional shrinkage | Medium | Very low |
| Shiny appearance of the surface | Non | Yes |

The invention claimed is:

1. A Composition for a construction material comprising a matrix predominantly containing a metakaolin, and an alkaline activation solution,
   wherein it contains less than 10 wt. % cement or clinker, wherein the metakaolin is a "flashed" metakaolin obtained via flash calcination of a powdered clay at a temperature between 600 and 900° C. for a few seconds, followed by a fast cooling,
   and wherein the alkaline activation solution comprises a source of sodium or potassium silicate (according to cement nomenclature containing $SiO_2$ and $M_2O$), and an alkaline base (noted as $M_2O$ according to cement nomenclature, with M able to represent the sodium or the potassium), with the relative proportions of the activation solution and of the matrix being such that the total sum in $SiO_2+M_2O$ moles of the activation solution is between 3.5 and 5.5 mol/kg of matrix, and wherein the alkaline activation solution has a global $SiO_2/M_2O$ molar ratio between 1.25 and 1.65.

2. The composition according to claim 1, wherein it contains a weight proportion in cement or clinker less than 5%.

3. The composition according to claim 2, wherein the alkaline base of the alkaline activation solution is an aqueous solution of NaOH.

4. The composition according to claim 1, wherein the matrix comprises, mixture(s) with flashed metakaolin, an unflashed metakaolin, one or several powdery mineral materials chosen from blast furnace slag, fly ash of class F, scraps from manufacturing chamotte and/or metakaolin, wollastonite, terra-cotta powder, mineral powders that have a puzzolanic activity, recycled glass powder, cullet, fly ash of class C or slaked lime.

5. The composition according to claim 4, wherein the mass concentrations of powdery materials in said matrix, mixed with at least 20% of metakaolin are as follows:
   less than or equal to 80%, for blast furnace slag, fly ash of class F, scraps from manufacturing chamotte and/or metakaolin, wollastonite and terra-cotta powder,
   less than or equal to 40%, for mineral powders that have a puzzolanic activity, recycled glass powder, cullet or fly ash of class C,
   and less than or equal to 15%, for slaked lime.

6. The composition according to claim 4, wherein the matrix comprises flashed metakaolin and blast furnace slag in a mass concentration in slag less than or equal to 30% of the total weight of the matrix.

7. The composition according to claim 1, wherein the relative proportions of the activation solution and of the matrix as such that the total sum in $SiO_2+M_2O$ moles of the activation solution is between 4.5 and 5.5 mol/kg of matrix.

8. The composition according to claim 1, wherein it contains one or several adjuvants.

9. The composition according to claim 1, wherein it contains one or several powder mineral additives, chosen from kaolin, powdered unfired clay, zinc oxide, plaster, high aluminous cement, titanium oxide, an ettringite binder, a fluorosilicate, in a concentration between 0.5 and 10 parts by weight, for 100 parts by weight of the matrix.

10. The composition according to claim 9, wherein the powdered unfired clay comprises mostly kaolinite or montmorillonite.

11. A method for producing a construction material comprising the mixing of constituents of the composition according to claim 1 with granulates chosen from fillers, powders, sand, chippings of gravel, and/or of fibres.

12. A method for producing a construction material comprising the mixing of the composition according to claim 1 with unfired clay and cold extrusion or cold moulding of said mixture.

13. A method for producing a construction material comprising the mixing of the composition according to claim 1 with "granulates" or plant fibres.

14. A method for producing an expanded construction material comprising the mixing of the composition according to claim 1 with an expanding or foaming agent.

15. Coating elements, coatings for walls, facing plates, cladding elements, or coverings for roofs comprising the composition according to claim 1.

16. Composite materials comprising the composition of claim 1.

17. Insulation modules of a density less than 1.5 kg/L comprising the composition of claim 1.

18. A method for the production via additive manufacturing comprising providing the composition of claim 1, and applying said composition to said production.

19. A two-component system for the production of sealing mastic, glue or mortar, comprising the composition of claim 1.

* * * * *